Sept. 8, 1970 L. O. MESENHIMER ET AL 3,527,894
VOLTAGE BOOSTING AND POLARITY CONTROL CIRCUIT
Filed June 29, 1967
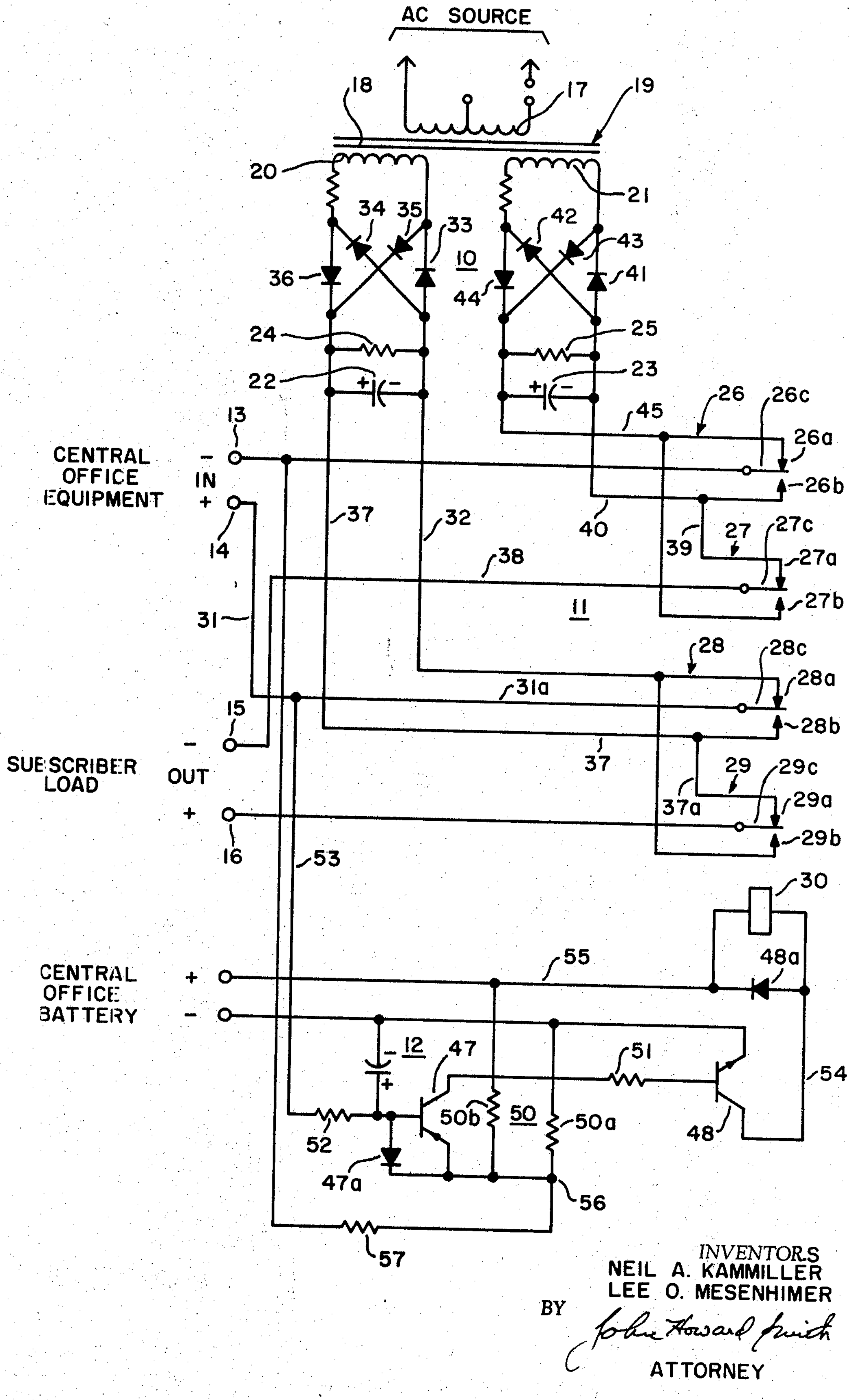
INVENTORS
NEIL A. KAMMILLER
LEE O. MESENHIMER
BY John Howard Smith
ATTORNEY

United States Patent Office 3,527,894
Patented Sept. 8, 1970

3,527,894
VOLTAGE BOOSTING AND POLARITY CONTROL CIRCUIT

Lee O. Mesenhimer, Lakewood, and Neil A. Kammiller, North Olmsted, Ohio, assignors to Lorain Products Corporation, a corporation of Ohio Filed June 29, 1967, Ser. No. 649,994
Int. Cl. H04b 3/00
U.S. Cl. 179—16 7 Claims

ABSTRACT OF THE DISCLOSURE

The invention is directed to the provision of an improved control network which includes a main source of DC voltage, an operated subscriber circuit energized by said main source, an auxiliary, boosting source of DC voltage connected between the operated circuit and the main DC source in series-aiding relationship to the main source and polarity sensing and control means connected between the main source and the auxiliary DC source to affect control of polarity relationship of the auxiliary source in accordance with changes of polarity in the exchange circuit to maintain the auxiliary source in said series-aiding relationship, said control means operating about a substantial midpoint of the main source voltage to detect polarity changes over a wide range in the central office terminal voltage.

This invention relates to voltage boosting circuits and is directed more particularly to voltage boosting for operating telephone installations having long subscriber loops subject to reverse battery supervision.

The long line adapters utilized in the past to render efficient the operation of telephone circuits having excessive voltage drop due to the length of the subscriber loop have had a number of disadvantages. These disadvantages include the high equipment investment and maintenance cost due to the need for dial pulse timing correction means, a ring repeat relay to detect ringing current and connect it through to the subscriber's line and special equipment to reverse battery upon answer for pay station loops beyond about 700 ohms resistance.

It is desirable to accomplish the voltage boosting activity by adding a source of DC voltage in the subscriber loop which will eliminate the need for special equipment to attain the above functions. In accordance with the invention the boosting source of DC voltage is added in series aiding relationship to the central office battery. However, in modern telephone practice the change in line polarity pattern, manifested at the central office equipment terminal system, referred to as reverse battery supervision, is utilized for many useful purposes which include the collection of coins for pay station operation, the counting of calls in a manual service or message rate exchange and to start the timer to time the length of the call in a direct dialing network.

Thus it will be seen that the mere addition of a series connected boosting source of DC voltage in the line will result in successive series aiding and series opposing relationships to the office battery as polarity is periodically changed at the central office equipment terminal system for the purposes above explained. The periods of series opposing relationship defeat the line boosting activity.

Accordingly, it is an object of the invention to provide a long line voltage boosting system which accommodates itself to a system utilizing reverse battery supervision.

It is another object of the invention to provide means, in a circuit including office battery and a DC boosting source, for controlling the polarity of the boosting source substantially simultaneously with supervisory changes in line polarity to thereby continuously maintain the boosting source in series aiding relationship to the office battery.

Another object of the invention is to provide, in a circuit including office battery and DC voltage boosting means, a network between the battery and the boosting means for sensing the change in line polarity and thereby effecting control of the polarity of the boosting means with respect to the polarity pattern at the central office equipment terminals, substantially coincidentally with line polarity changes for supervisory purposes.

Still another object of the invention is to provide economical sensing means for the purposes set forth above.

Another object of the invention is to provide an improved sensing and polarity control network which requires no additional power source and which may be energized from the office battery.

Still another object of the invention is to provide novel sensing means in circuitry of the above character which ensures that spurious polarity change in the DC voltage boosting source will not be initiated when the circuitry of the invention is installed in long lines having different resistances and thus exhibiting different voltages at the central office equipment terminal system.

More specifically it is an object of the invention to provide an improved control network which includes a main source of DC voltage, an operated subscriber circuit energized by said main source, an auxiliary, boosting source of DC voltage connected between the operated circuit and the main DC source in series aiding relationship to the main source and polarity sensing and control means connected between the main source and the auxiliary DC source to effect control of polarity relationship of the auxiliary source in accordance with changes of polarity in the exchange circuit.

Other objects and advantages of the invention will become apparent in the following description and accompanying drawing in which the single figure is a schematic diagram of an exemplary power boosting and polarity changing circuit embodying the features of the invention.

As shown in the single figure an exemplary circuit embodying the invention includes a power booster section 10, a polarity control section 11 and a polarity sensing section 12.

The power boosting section 10 in the present embodiment, comprises a pair of DC power supply units each consisting of a bridge rectifier, one in each side of the line between the central office terminal system 13 and 14 connected to the central office equipment in the exchange, and terminals 15 and 16 which are connected to the long line subscriber loop, the resistance of which, due to its length, must be overcome by the boosting activity of the power supply units to assure reliable operation of equipment on the subscriber loop.

The bridge rectifiers derive their power from any suitable AC source such as AC commercial power or preferably, central office battery. In the latter case it will be understood that any suitable inverter means may be inserted between central office battery and the rectifiers in order to provide necessary AC power thereto. The AC source as shown herein comprises a primary winding 17 on the core 18 of transformer 19.

Winding 20 and 21 of the respective rectifiers comprise the secondary windings on the core 18 and the output of the respective rectifiers is suitably filtered as by respective capacitors 22 and 23. Respective resistors 24 and 25 serve to aid in the regulation of the rectifier output.

As will be seen presently the voltage boosting sources are connected between central office equipment terminals 13 and 14 and the subscriber load terminals 15 and 16 in series aiding relationship whereby the voltage supplied by the rectifiers is added to that of central office battery to obtain the desired voltage boosting action.

As indicated previously, in present telephone practice reverse battery supervision is used extensively to operate relays for special purposes.

In view of the periodic reversal of the polarity pattern at the central office equipment terminal system 13 and 14 it will be seen that the connections of the rectifiers in rectifier section 10 must likewise be reversed coincidently with the supervisory polarity change if the voltage boosting activity of the rectifiers is to be continuous. A change in polarity at input terminals 13 and 14 without effecting a corresponding change in the rectifier connections would result in a net voltage reduction in the circuit which, it will be understood, would be detrimental to operation of subscriber equipment on the long loop between terminals 15 and 16.

To the end that the coincidental polarity control of rectifiers in the rectifier section 10 with polarity changes at terminals 13 and 14 may be accomplished there is inserted in the line between the rectifiers and the terminals 13 and 14, means for accomplishing this polarity control of the rectifiers. This means, in the embodiment shown herein, is a plurality of relay contacts 26, 27, 28 and 29 having actuating means which here takes the form of a coil 30. As will be seen presently, the contacts have two stages or modes, one for each polarity pattern of terminals 13 and 14.

Each of the contact sets has fixed contacts *a* and *b* and a movable contact *c* as shown. When the polarity at terminal 14 is positive the coil 30 is deenergized in a manner to be explained presently and the movable contacts *c* of the relays are in the upper position shown. It will be understood that while a single loop boosting configuration is shown herein, this configuration can be multiplied depending upon the number of subscriber loops which are to be subjected to the boosting activity of the invention.

Assuming the polarities to be as shown at terminals 13 and 14, it will be seen that current from the terminal 14 flows through leads 31 and 31*a*, through movable contact 28*c* to the fixed contact 28*a*, through lead 32 and then, depending upon the instantaneous polarity of coil 20, through diode 33 or 34, through winding 20, through diode 35 or 36 out of the rectifier through lead 37, through lead 37*a*, fixed contact 29*a*, movable contact 29*c* and out into the subscriber loop through terminal 16.

This circuit of the subscriber loop is completed from terminal 15 by lead 38, movable contact 27*c*, fixed contact 27*a*, leads 39 and 40 and through the other half of the rectifier 10 by way of lead 40, diodes 41 or 42, through winding 21 and diodes 43 or 44, through lead 45, fixed contact 26*a* movable contact 26*c* and into central office by way of terminal 13.

As will be seen presently, when the polarity of terminal 14 is positive, the relay coil 30 is deenergized and the relays are in the position shown the energy of the AC source, through the rectifiers, being added to that of central office battery to provide the desired boosting action.

Assuming that the exchange is a 48-volt system and that the AC source to the rectifiers is from 48-volt office battery to a suitable inverter it will be seen that the rectifiers, having similar parameters will, due to the action of transformer 19 each add 24 volts to the system.

As indicated previously the operation described above is brought about by the position of the movable contacts *c* of the respective contact sets to one of two states of modes, this position resulting from the deenergized condition of coil 30. The coil 30 is incorporated in the sensing circuit 12, this circuit also including a PNP transistor 47 and NPN transistor 48. Similarly, the transistors assume one of two states or modes.

The emitter of the transistor 47 is connected to the junction point 56 of a voltage divider 50 consisting of resistors 50*a* and 50*b* the resistances of which are made substantially equal so that the junction point 56 is substantially the midpoint of office battery, while the collector of transistor 47 is connected through resistor 51 to the base of transistor 48. The base of transistor 47 is connected in sensing relationship, through current limiting resistor 52, lead 53 and lead 31 to the central office equipment terminal 14.

The emitter of NPN transistor 48 is connected to the negative terminal of central office battery while the collector thereof is connected to the positive terminal of the battery through lead 54, coil 30 and lead 55 energize the coil 30 when the emitter-collector path of transistor 48 is conducting. A diode 48*a* is provided across the coil 30 as shown to protect the transistor 48 against overvoltage from coil 30 turnoff of transistor 48.

Leads 53 and 31, with respect to transistor 47, may be termed sensing leads in that they impress the voltage and polarity of central office equipment terminal 14 upon the base of transistor 47. A diode 47*a* is connected between the base and emitter of transistor 47 to limit detrimental reverse voltage.

Assuming that battery voltage is 48 volts the voltage at the reference point 56 will be substantially 24 volts. Under these circumstances, considering the transistor 47 as the comparing means, its base is sensing the voltage a central office equipment terminal 14 which voltage varies with central office operating conditions as well as with the length of the subscriber loop in the particular installation. On the other hand the emitter of transistor 47 is sensing a relatively firm 24-volt battery midpoint at the junction 56. Since the 24-volt reference at junction 56 is midway between 0 ground voltage and —48 volts of central office battery, the power source for central office equipment, equal allowable ranges of variation in voltage away from 0 volt or —48 volts at terminal 14 are accommodated before polarity control is initiated by transistors 47 and 48 and coil 30. Under the circumstances it will be seen that transistors 47 and 48 operate as two-state binary devices. Thus they are either on or off depending upon the polarities at terminals 13 and 14 and are not influenced by circuit conditions or parameters which vary from the ideal 0 volt and —48 volts at those terminals. With the mid-battery reference at junction 56, polarity control from coil 30 occurs at polarity reversal only without any effect from voltage variation at the central office equipment terminal system.

The operation of the sensing circuit section 12 will now be described. As indicated, transistor 47 is of the PNP type and is thus rendered conducting when the base thereof becomes more negative than the emitter thereof. It is for this reason that the movable contacts *c* in relays 26, 27, 28 and 29 are in the position shown, this resulting from the positive polarity which is being sensed through leads 31 and 53. Since transistor 48 is of the NPN type it is rendered conducting when the base thereof is more positive then the emitter thereof and in view of the nonconducting condition of transistor 47 as described previously transistor 48 is likewise nonconducting whereby central office battery is unable to energize the coil 30.

In the absence of actual polarity changing for supervisory purposes across terminals 13 and 14, variation of voltage occuring due to the state of central office equipment will not be sensed by the transistor 47 as a polarity change in view of the 24-volt reference at junction 56. Assuming now that there is supervisory polarity change at terminals 13 and 14 the base of transistor 47 will sense the negative polarity at terminal 14 and will thus be rendered conducting since the base will be more negative than the reference junction 56. When the transistor 47 conducts it renders the base of the transistor 48 more positive than the emitter thereof and therefore the latter transistor is rendered conducting to connect central office battery across the coil 30 to energize it and pull the movable contacts *c* of contacts sets 26, 27, 28 and 29 from fixed contacts *a* to fixed contacts *b*.

When the circuit is in this condition it will be seen that current flow from terminal 13 will be through movable contacts 26c, fixed contact 26b, lead 40, diode 41 or 42, coil 21, diode 43 or 44, lead 45, fixed contact 27b, movable contact 27c and lead 38 to terminal 15. After traversing the subscribers loop current flow is through terminal 16, movable contact 29c, fixed contact 29b, lead 32, diode 33 or 34, winding 20, diode 35 or 36, lead 37, fixed contact 28b, movable contact 28c, and lead 31 back to central office equipment terminal 14.

To the end that the sensing current drain is equal on both sides of the line the resistor 57 is connected between the midpoint 56 of the voltage divider 50 and the central office equipment terminal 13, the polarity of which is not being sensed. As described previously a resistor 52 of equal resistance is connected between the base of transistor 47 and the central office equipment terminal 14 which the base senses through leads 53 and 31. It will be understood that the resistors 52 and 57 serve the purpose above described since there is only a small voltage difference between the base and the emitter of transistor 47.

From the foregoing it will be seen that there is provided improved circuitry whereby voltage boosting means inserted in the lines in series aiding relation to central office battery is maintained in this condition by novel and economical polarity control means responsive to polarity changes at the central office equipment terminal system, which changes occur upon reverse battery supervisory activity.

What is claimed is:

1. In a voltage boosting system for telephone subscriber loops in circuits utilizing reverse office battery supervision, in combination, central office equipment terminals, subscriber loop terminals, means for electrically connecting said equipment and subscriber terminals including D.C. voltage boosting means, means for connecting said voltage boosting means in series aiding relationship with respect to said central office equipment terminals, means for controlling the polarity of said D.C. voltage boosting means with changes in the polarity of said central office equipment terminals to maintain said series aiding relationship, and means for actuating said polarity controlling means including off-on conducting means, an actuator for reversing the condition of said polarity controlling means in accordance with polarity changes at said central office equipment terminals, means for connecting said actuator in electrically responsive relation to said off-on conducting means, sensing means for connecting said off-on conducting means to one of said central office equipment terminals to energize the same for one polarity and to deenergize the same for the other polarity and means for connecting said actuator through said off-on conducting means to the central office battery.

2. In a voltage boosting system for telephone subscriber loops in circuits utilizing reverse office battery supervision, in combination, central office equipment terminals, subscriber loop terminals, means for electrically connecting said terminals including D.C. voltage boosting means, means for connecting said voltage boosting means in series aiding relationship with respect to said central office equipment terminals, polarity controlling means, means for connecting said polarity controlling means in series with said voltage boosting means between said central office equipment terminals and said subscriber loop terminals, said polarity controlling means being characterized by two modes, one to establish each polarity relationship of said voltage boosting means in the system, means for establishing the instantaneous state of the polarity controlling means in accordance with the polarity of one of said central office equipment terminals including off-on conducting means, sensing means for connecting said off-on conducting means to one of said central office equipment terminals, actuating means for establishing one or the other of the modes of said polarity controlling means, means for connecting said actuating means in series with said off-on conducting means to change the mode of said actuating means in accordance with the polarity of said one central office equipment terminal.

3. In a voltage boosting arrangement for a telephone system having a central office equipment loop including central office battery and a subscriber loop, in combination, a central office equipment terminal system of the character which reverses in polarity at the terminals, a subscriber loop terminal system, means for electrically connecting said equipment and subscriber terminal systems including D.C. voltage boosting means, means for connecting said boosting means in series aiding relationship with respect to said central office equipment terminal system, a sensing network and a polarity controlling network for maintaining said D.C. voltage boosting means in series aiding relationship with said central office equipment terminal system upon polarity reversal at said system, said polarity controlling network including two-mode operating means adapted to operate in a first mode during one polarity pattern at said central office equipment terminal system and to operate in a second mode during another polarity pattern at said terminal system thereby to connect unlike poles of said D.C. voltage boosting means and said central office equipment terminal system during both polarity patterns at said terminal system, said sensing network including two-mode operating means adapted to operate in a first mode during one polarity pattern at said central office equipment terminal system and to operate in a second mode during another polarity pattern at said terminal system, means for connecting said sensing network in polarity, responsive relationship to said central office equipment terminal system.

4. In a voltage boosting arrangement for an electrical source system of the type adapted to periodically present first and second polarity conditions at output terminals thereof, in combination with said output terminals, input terminals for an operated electrical system, means for electrically connecting said output terminals of said electrical source system to said input terminals of the operated electrical system, said connecting means including D.C. voltage boosting means, polarity controlling means for changing the polarity of the connection of said D.C. booster source means to said output terminals, said polarity controlling means including a first switch means for connecting said D.C. booster source means in series aiding relationship between said input and output terminals when the said voltage between said output terminals has a first polarity and second switch means for connecting said D.C. booster source means in series aiding relationship between said input and output terminals when the voltage between said output terminals has a second polarity, sensing means, said sensing means including two state conducting means, means for operatively connecting said two-state conducting means to said output of said electrical source system in polarity pattern responsive relationship thereto, said two-state conducting means being disposed in operative, controlling relationship to said first and second switch means to establish an electrical connection between unlike poles of the D.C. voltage boosting means and the electrical source system output terminals in accordance with any reversal of the D.C. polarity pattern at said output terminals.

5. In a voltage boosting arrangement for an electrical source system of the type adapted to periodically present a reverse polarity condition at the output terminals thereof, in combination with said output terminals, input terminals for an operated electrical system, means for electrically connecting said output terminals of said electrical source system to said input terminals of the operated electrical system, said connecting means including D.C. voltage boosting means, a network for connecting said D.C. voltage boosting means in series aiding relationship with respect to said output terminals of said electrical source system for both polarities of said electrical source system, said connecting network including means for connecting the then positive terminal of said electrical source system to the negative terminal of said D.C. voltage boosting means when said electrical source system has a first polarity, means for connecting the then negative terminal of said electrical source system to the positive terminal of said D.C. voltage boosting means when said electrical source system has a second polarity, means for connecting the positive terminal of said D.C. voltage boosting means to one terminal of said operated electrical system when said electrical source system has said first polarity, means for connecting the negative terminal of said D.C. voltage boosting means to said one terminal of said operated electrical system when said electrical source system has said second polarity, means for connecting the then remaining terminal of the electrical source system to the then remaining terminal of said operated electrical system when said electrical source system has said respective first and second polarities, a sensing network, said network including off-on conducting means, means for operatively connecting said off-on conducting means to said output of said electrical source system in polarity pattern responsive relationship thereto, said off-on conducting means being disposed in operative relationship to said connecting means.

6. In a voltage boosting system as set forth in claim 4, voltage divider means, means for connecting said voltage divider means across the electrical source system and to said two-state conducting means to establish a substantially mid-source voltage reference for said sensing means.

7. In a voltage boosting arrangement as set forts in claim 4, voltage divider means, means for connecting said voltage divider means across the electrical source system to establish a mid-source voltage reference with respect to the voltage across said electrical source system, means for connecting said sensing means between the electrical source system and said mid-source voltage reference.

References Cited

UNITED STATES PATENTS 2,055,647 9/1936 Bowne.

KATHLEEN H. CLAFFY, Primary Examiner

J. S. BLACK, Assistant Examiner

Notice of Adverse Decision In Interference

In Interference No. 97,908 involving Patent No. 3,527,894, L. O. Mesenhimer, and N. A. Kammiller, VOLTAGE BOOSTING AND POLARITY CONTROL CIRCUIT, final judgment adverse to the patentees was rendered Oct. 16, 1972, as to claims 3, 4 and 5.

[*Official Gazette December 12, 1972.*]